United States Patent
Lee et al.

(10) Patent No.: US 8,202,189 B2
(45) Date of Patent: Jun. 19, 2012

(54) LIMITED SLIP DIFFERENTIAL

(76) Inventors: Kuo-Ming Lee, Kaohsiung (TW);
Yu-An Hsieh, Kaohsiung (TW)

( * ) Notice: Subject to any disclaimer, the term of this patent is extended or adjusted under 35 U.S.C. 154(b) by 560 days.

(21) Appl. No.: 12/500,067

(22) Filed: Jul. 9, 2009

(65) Prior Publication Data
US 2010/0056313 A1 Mar. 4, 2010

(51) Int. Cl.
*F16H 48/05* (2012.01)
(52) U.S. Cl. .......................... 475/252; 475/91
(58) Field of Classification Search .......... 475/91, 475/112, 204, 205, 248, 249, 252
See application file for complete search history.

(56) References Cited

U.S. PATENT DOCUMENTS

| | | | | |
|---|---|---|---|---|
| 3,406,593 A * | 10/1968 | Vesey | | 475/249 |
| 4,272,993 A * | 6/1981 | Kopich | | 475/90 |
| 5,147,252 A * | 9/1992 | Mace et al. | | 475/226 |
| 6,135,909 A * | 10/2000 | Keiser | | 475/107 |
| 6,932,734 B2 * | 8/2005 | Hwa et al. | | 475/221 |
| 2003/0195077 A1 * | 10/2003 | Liu | | 475/248 |
| 2009/0227413 A1 * | 9/2009 | Yanay | | 475/159 |

* cited by examiner

*Primary Examiner* — Justin Holmes
*Assistant Examiner* — Huan Lee
(74) *Attorney, Agent, or Firm* — Rosenberg, Klein & Lee (57) ABSTRACT

A limited slip differential includes a driving plate, backing plates, differential gear assemblies, and a transmission assembly engaged together inside a sealed casing where fluid is pumped. The driving plate has pairs of communicated openings for interlocking two gears of each gear assembly, which extend by opposite directions from the driving plate for separately engaging with the transmission assembly. While synchronously rotating the plates, the gear assemblies are alternatively soaked into the fluid and each permits the fluid passing among the gears for adjusting the rotational speed. In the event that the rotational speed difference of axle shafts of the vehicle exceeds a threshold value, the LSD applies at least one gear assembly to generate a back pressure and efficiently block the fluid passing through the gears for limiting mutual rotational speed difference, hence achieving a limited-slip effect.

13 Claims, 9 Drawing Sheets

LIMITED SLIP DIFFERENTIAL

BACKGROUND OF THE INVENTION

1. Field of the Invention

The present invention relates to differentials, particularly to a limited slip differential applied to a vehicle.

2. Description of the Related Art

Differentials are well-known mechanisms and comprised of means to adequately transfer rotational torque when there are differences on rotational speeds between the opposite output axle shafts of wheels on the vehicle. A conventional mechanical differential includes two planetary gears meshing with side gears on two output shafts, whereby the planetary gears are significantly driven according to the different rotational speed between the side gears. When the wheels rotate on different road engagements to produce different rotational speed, the conventional differential is passively triggered without restricting rotations of the two axle shafts. Once the vehicle is driven on a humid or greasy road to cause the wheel slipped or soared, the slipped wheel idly rotates and the other wheel loses the supported dynamic torque imparted from the vehicle as well, thence rendering the vehicle unable to formally operate. To improve the existences of idle rotation or the lack of the dynamic torque, various limited slip differentials (LSD) are produced afterward. The main LSDs commonly include a clutch-type mechanical LSD, a torque sensitive LSD relying on frictions between helical gears, a clutch LSD configured of multiple discs and shafts for a mutual interlocking via a pressure ring squeezing the discs, and a viscous coupling type LSD relying on silicon-based oils with high viscosity to compress stacks of clutch discs under a heat expansion and create a hydrodynamic friction for coupling the discs. Whereas, deficiencies attendant on the differentials are complex structures, an uneasy repairing and maintenance, and an effective operation under a large speed difference.

SUMMARY OF THE INVENTION

The objective of the present invention is to offer a limited slip differential benefiting a convenient installation and maintenance without complicate parts for decreasing costs, efficiently adjusting a rotational speed difference, and attaining a limited-slip effect.

The limited slip differential adapted to a vehicle in accordance with the present invention mainly comprises a sealed differential casing containing fluid, a driving plate disposed in the accommodating space, two backing plates pivotally connected with both sides of the driving plate, a plurality of differential gear assemblies disposed on the driving plate and a transmission assembly synchronized with the gear assemblies. Wherein, the driving plate includes a plurality pairs of openings and each pair is in communication, so that two differential gears of each gear assembly would interlock and rotatively mesh with each other. The two gears respectively penetrate through the correspondent openings and holes for separately engaging with two planetary gears and sun gears of the transmission assembly; each backing plate further provides holes disposed relatively to the above openings for traveling the fluid through the interstices between the two differential gears. Each sun gear includes an axis oppositely pivoted to the driving plate and extended to an axle shaft of the vehicle. Accordingly, the present invention needs not complicated components for attaining a convenient assemblage and maintenance. Moreover, when the vehicle simultaneously drives the transmission assembly along with the above plates, the differential gear assemblies are triggered to promote a mutual rotating relationship so as to adjust the rotational speed of the axle shafts. In the event that a rotational speed difference between the axes of the sun gears driven by the vehicle exceeds a predetermined threshold, at least one differential gear assembly immediately delivers a back pressure to avoid seeping the fluid between the two differential gears, and then the two meshed gears would stop rotating to prevent from enlarging the rotational speed difference. Thus, the LSD efficiently benefits a limited-slip effect as well.

The advantages of the present invention over the prior arts are more apparent by reading following descriptions with drawings.

DETAILED DESCRIPTION OF THE PREFERRED EMBODIMENTS

Before describing in details, it should note the like elements are denoted by similar reference numerals throughout the disclosure.

Figure 1:
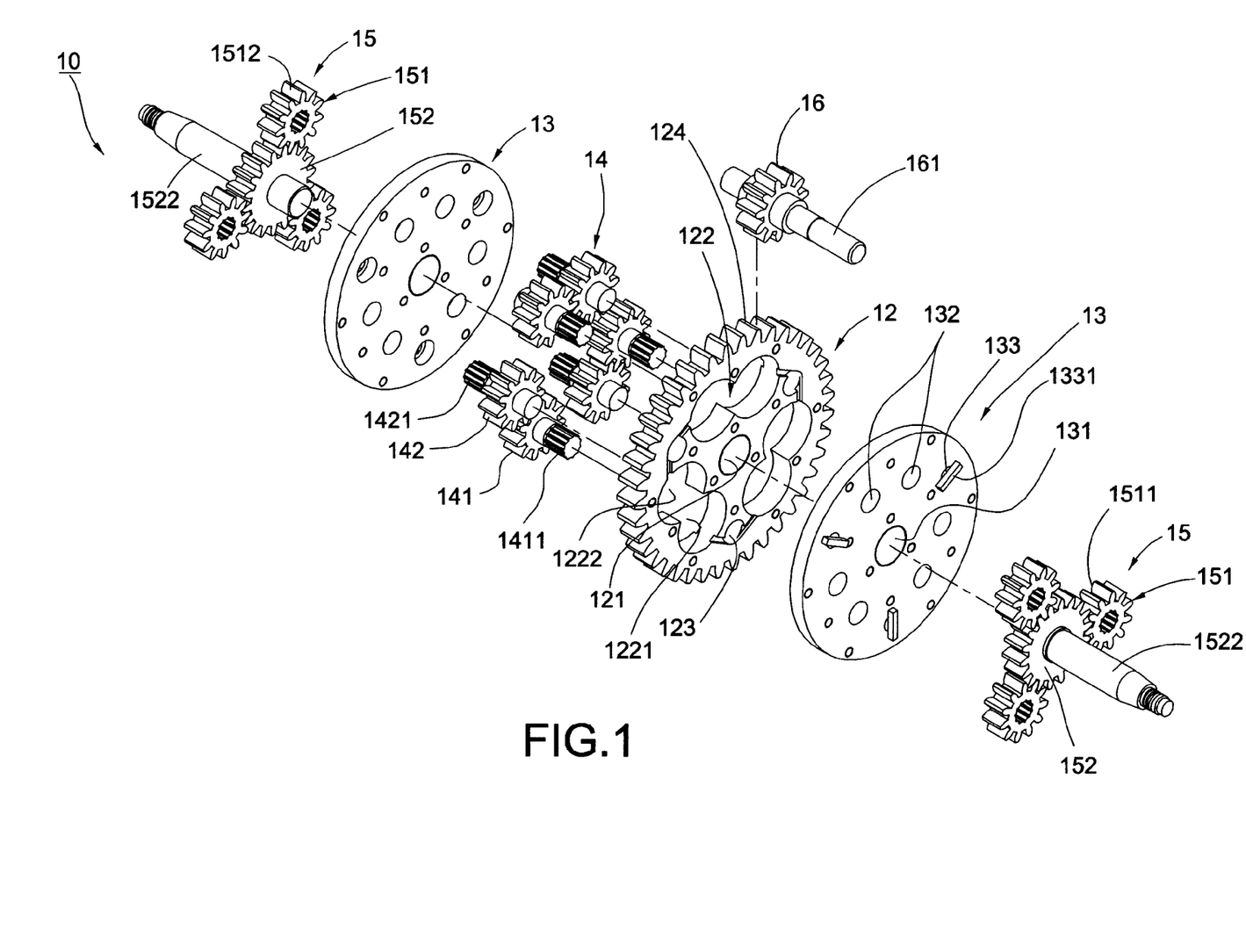
FIG. 1 is an exploded view showing a first preferred embodiment of the present invention.
Figure 2:
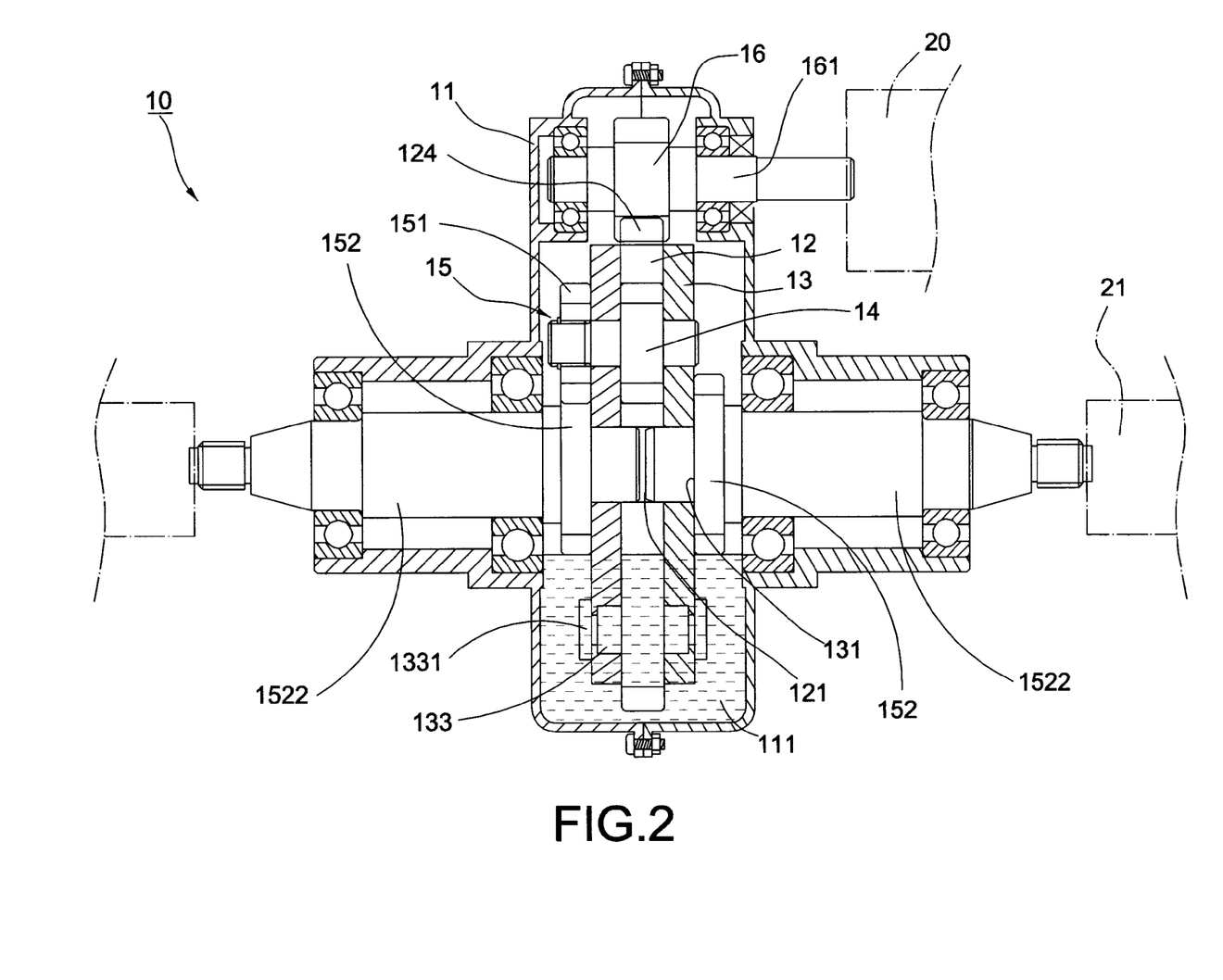
FIG. 2 is a schematic view of the first preferred embodiment.

Referring to FIGS. 1 and 2 shows a limited slip differential (LSD) 10 of the first preferred embodiment adapted to a vehicle (not shown) comprising a differential casing 11, a driving plate 12 disposed within the differential casing 11, two backing plates 13 respectively attached to both sides of the driving plate 12, a plurality of differential gear assemblies 14 mounted on the driving plate 12, and a transmission assembly 15 engaged and synchronized with the differential gear assemblies 14. Wherein, the differential casing 11 is interlocked to form a sealed room, in which a shared accommodating space 111 is defined to contain fluid. Further, the driving plate 12 is placed within the accommodating space 111 for partially soaking in the fluid, which further includes an inserting bore 121 and pairs of openings 122 substantially disposed around the inserting bore 121; three pairs of openings 122 are adopted herein; each pair of the openings 122 is comprised of a first opening 1221 juxtaposed and communicated with a second opening 1222. Additionally, each pair of the openings 122 has both sides thereof forms respective troughs 123, and each trough 123 through the driving plate 12 communicates with any two adjacent openings 122. Furthermore, the driving plate 12 provides with a series of gear teeth 124 formed on the periphery thereof and stick them out of the circumference of the two backing plates 13. In the event the gear teeth 124 is offered, a driving gear 16 is adequately disposed within the differential casing 11 to interlock with the gear teeth 124 and comprised of a driving shaft 161 protruding out of the differential casing 11 for pivoting to a power source 20 of the vehicle.

The backing plates 13 respectively provide the inner sides thereof fastening to both sides of the driving plate 12 for synchronizing therewith and each comprises an inserting orifice 131 and a plurality of holes 132 spaced apart around the inserting orifice 131; the holes 132 are disposed correspondently to the first and second openings 1221,1222. Moreover, the backing plate 13 also defines a plurality of apertures 133 located correspondently to the troughs 123 on the driving plate 12 and blockers 1331 discretely disposed outside the apertures 133 and orientated toward a center of the backing plate 13, whereby the fluid sequentially passes through the apertures 133, the holes 132, the troughs 123, and thence into the openings 122 via the blockers 1331. Furthermore, the gear assemblies 14 are accommodated into relative openings 122 of the driving plate 12 and the gear shafts thereof would thence go through the holes 132 of the backing plates 13. Herein, three gear assemblies 14 are adopted. Each differential gear assembly 14 has a first differential gear 141 embedded into the first opening 1221 of the driving plate 12 and a second differential gear 142 located within the second opening 1222, so that the first differential gear 141 significantly meshes with the second differential gear 142 for permitting the fluid to enter interstices between respective edges thereof through the openings 122 and the holes 132. Furthermore, the first and second differential gears 141,142 have respective extensions oppositely extending from the driving plate 12, namely, the first differential gear 141 has a first extension 1411 protruding to one side (e.x. right side), and the second differential gear 142 provides with a second extension 1421 protruding oppositely to where the first extension 1411 extends (e.x. left side) for respectively connecting with the transmission assembly 15.

Figure 3:
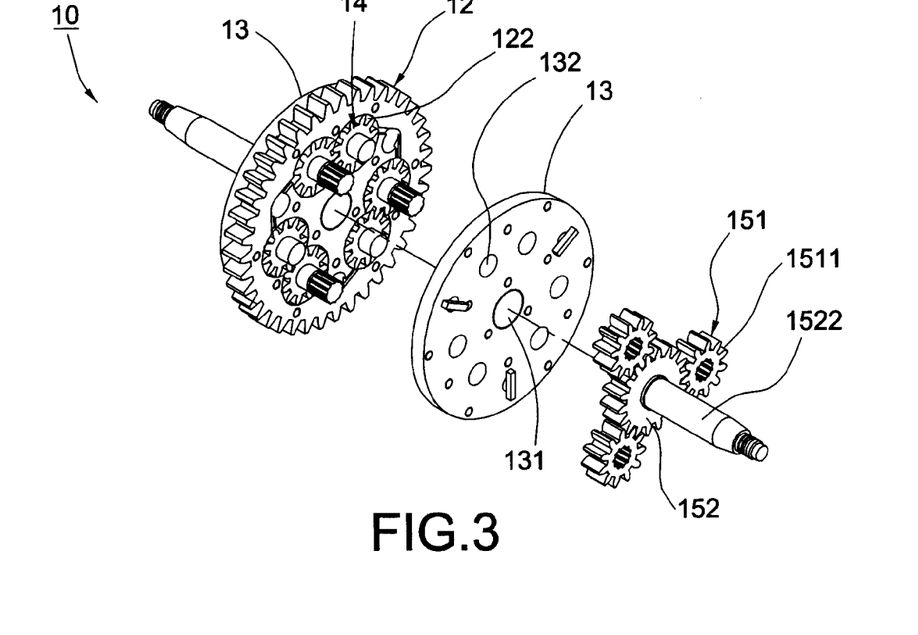
FIG. 3 is an exploded view showing of FIG. 1 in assemblage.

Still referring to FIG. 1, the transmission assembly 15 engages with the differential gear assemblies 14 for synchronizing therewith and includes two sets of planetary gears 151 respectively disposed on both exterior sides of the two backing plates 13 and two sun gears 152 separately meshing with the planetary gears 151; wherein, the planetary gears 151 respectively comprise a first planetary gear 1511 and a second planetary gear 1512. The two planetary gears 151 could be as substantive configurations, whereby the first and second differential gears 141,142 provided with the extensions 1411, 1421 penetrating through the correspondent openings 122 and holes 132 for separately engaging with the first and second planetary gears 1511, 1512, which thence mesh with respective sun gears 152 in FIGS. 3 and 4. Alternatively, FIG. 5 shows the first and second planetary gears 1511,1512 are integrated with respective gear shafts of the first and second differential gears 141,142, so that the differential gears 141, 142 directly mesh with the sun gears 152. In preferred embodiments, the configuration of FIG. 1 is herein adopted.

Figure 4:
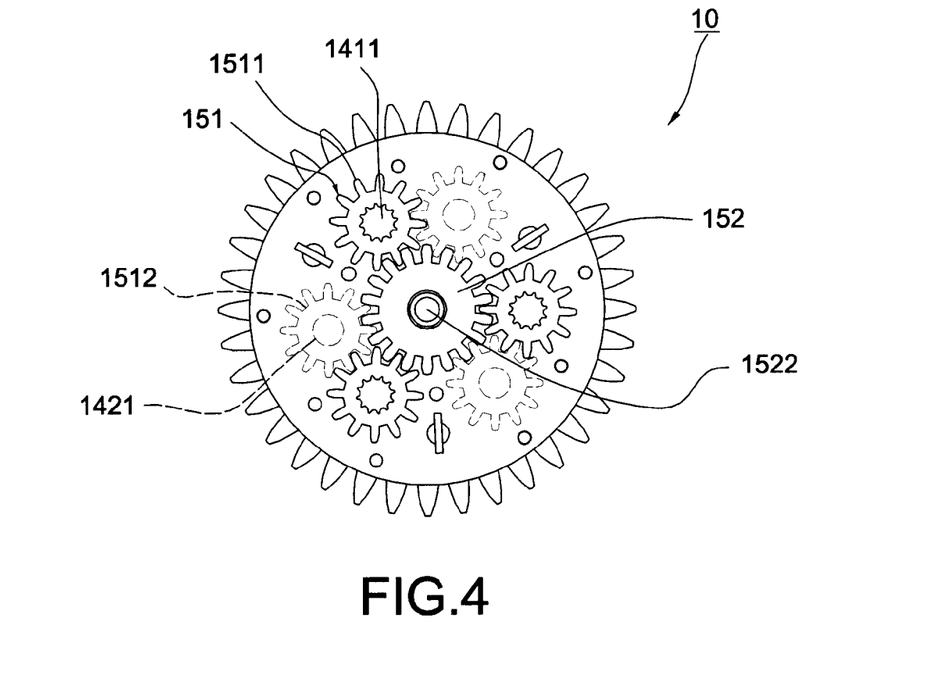
FIG. 4 is a side view showing of FIG. 3.
Figure 5:
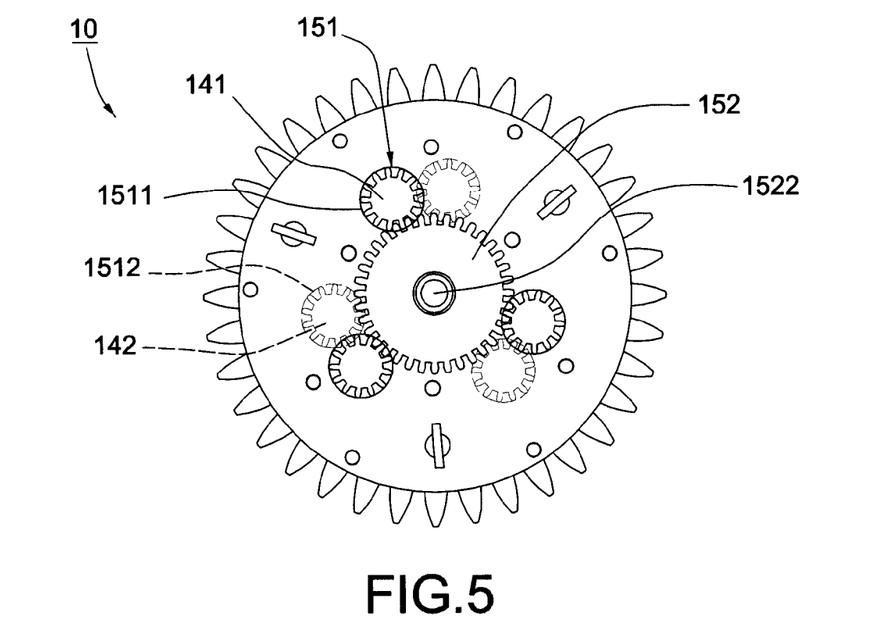
FIG. 5 is a side view of a modification of the first embodiment.
Figure 6:
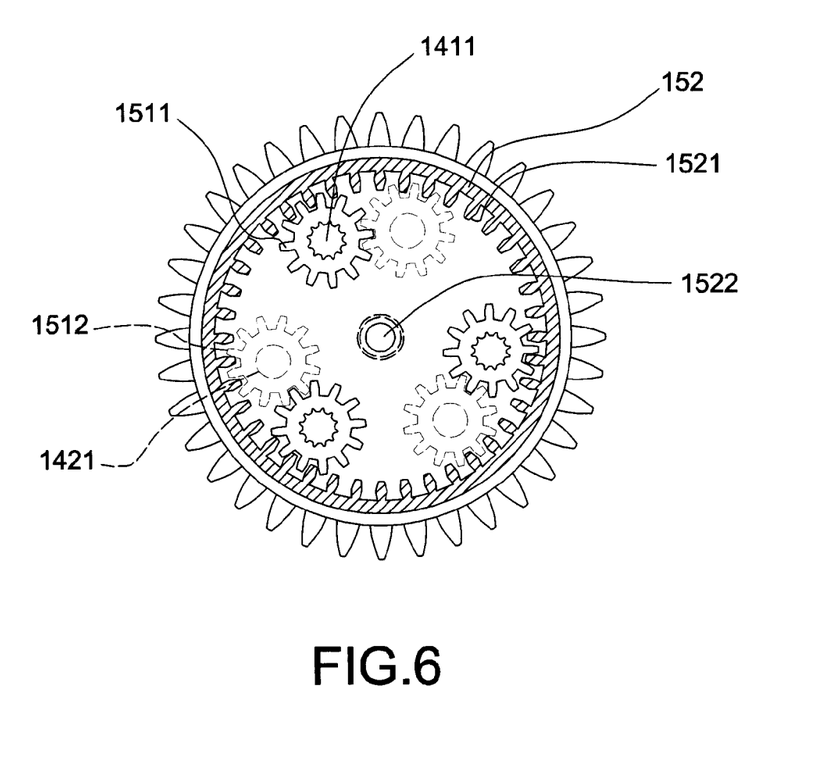
FIG. 6 is a side view of another modification of the first embodiment.

Referring to FIGS. 4 and 5, two sun gears 152 essentially mesh their exterior teeth with an outer periphery of the first and second planetary gears 1511,1512, or the sun gears 152 may have interior teeth 1521 meshing with an outer periphery of the first and second planetary gears 1511,1512 as shown in FIG. 6. Still referring to FIG. 2, Each sun gear 152 has an axis 1522 provided with one side thereof fastening to the inserting bore 121 of the driving plate 12 through the inserting orifice 131 of the backing plate 13 and with the other side thereof protruding out of the differential casing 11 for mounting on two axle shafts 21 of the vehicle, therefore the driving plate 12, the backing plates 13, the differential gear assemblies 14 and the transmission assembly 15 are firmly assembled to accomplish a complete LSD 10. It should also noted that the differential gear assemblies 14, planetary gears 151, and the sun gears 152 could be used by either a spur gear, a helical gear, or a double-helical gear.

Referring to FIGS. 1 and 2, while in assemblage, the fluid (e.x. oil or grease) is pumped into the shared accommodating space 111 in an adequate proportion. While operating, a power source 20 of the vehicle initially delivers a dynamic torque to the driving shaft 161 to rotate the driving gear 16 and then the gear teeth 124, and simultaneously the vehicle axle shafts 21 are driven by the vehicle wheels (not shown) to rotate the axes 1522 of the sun gears 153. The driving plate 12 and the backing plates 13 would synchronically become revolutions as well. Accordingly, the planetary gear 151 along with the gear assembly 14 rotates and soaks into fluid in turn. Even one of gear assemblies 14 leaves the fluid during the revolution and rotation, the fluid inside the gear assembly 14 would still flow downward through the trough 123 into the adjacent first and the second openings 1221,1222. The fluid remaining on the surfaces of the two backing plates 13 is introduced into the apertures 133 via the obstruction of the blocks 1331 to enter into the adjacent openings 1221,1222 as well, and thereafter the gear assembly 14 would immerse into the fluid again, so that every gear assembly 14 is soaked with fluid on their surfaces and a volume of fluid delivery indicating the quantity of the fluid entering each differential gear assembly 14 is created.

Figure 7A:
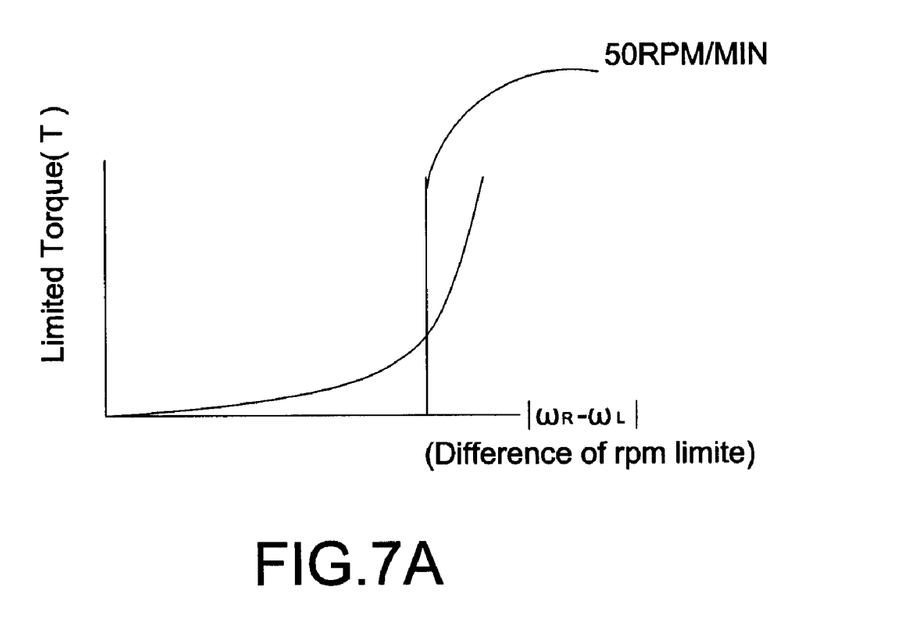
FIG. 7A-7B are graph views of the operation of the present invention.

In this manner, when the vehicle drives forward or backward directly, every differential gear assembly 14 synchronically revolves with the driving plate 12 and the backing plates 13 attributably to the axle shafts 21 having the same rotational speed, therefore no mutually rotating relationship is occurred, namely the meshed first and the second differential gears 141,142, the axes 1522 of the sun gears 152 on the axle shafts 21, the first and second planetary gears 1511, 1512, the driving plate 12, and the backing plates 13 are in a same revolution, and the LSD 10 does not restrict the rotating speed of the vehicle wheels. While turning the vehicle, the axle shafts 21 along with the two axes 1522 on vehicle wheels (right and left) inevitably provide different revolution speeds relying to the different required rotation distance, which thence generates a rotational speed difference. Thus, the axes 1522 respectively motivate a relative motion of the differential gear assemblies 14, by which each of meshed differential gears 141 and 142 have different rotation speed and either of which relatively rotates faster than the other one. A specified volume of the fluid release traveling through the interstices between edges of the gears 141,142 is preferably created. Further shown in FIG. 7A, in the even that the rotational speed difference $|\omega_R - \omega_L|$ on the axes 1522 of the two side wheels of the vehicle is smaller than a predetermined threshold (e.x. 50 rpm/min) to render the volume of fluid delivery to be smaller than the volume of fluid release, the first differential gear 141 becomes meshing rotatively with the second differential gear 142 because the fluid is permissibly traveled through the interstices between the edges of the first and second gears 141,142 for promoting a mutual motion thereof, so as to attain the merit of the speed limitation and conduce propitiously turning the vehicle.

Figure 7B:
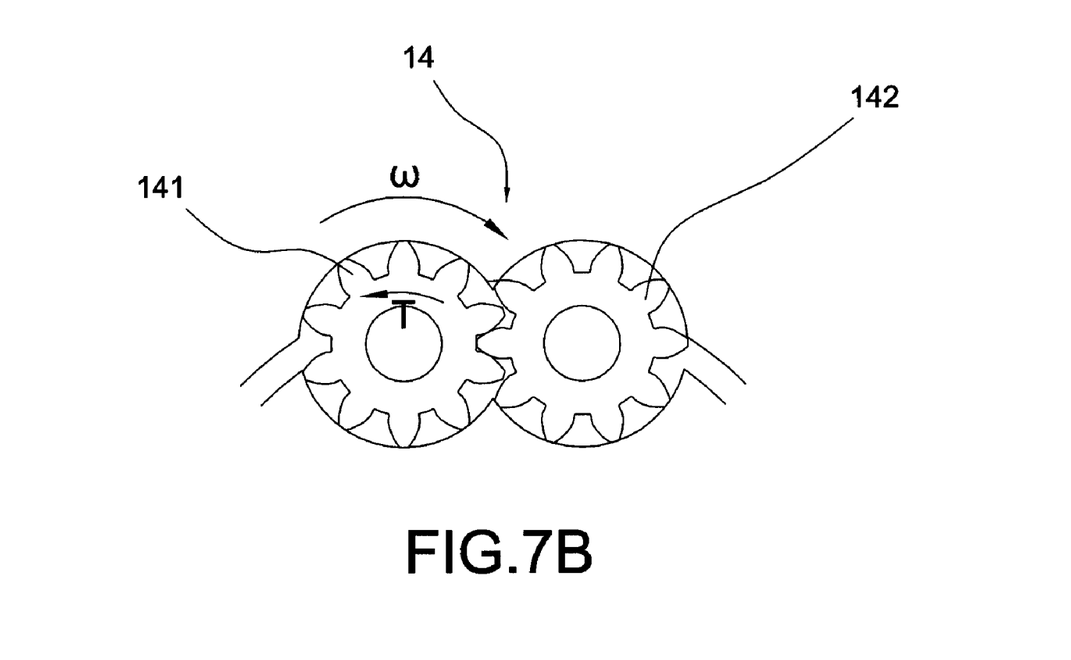

When the vehicle has either of the wheels slipped or soared on a defected road condition (e.x. on a humid ground or a non-level ground), the rotational speed difference between the axle shafts 21 and the two axes 1522 accordingly expands. As long as the rotational speed difference $|\omega_R - \omega_L|$ of the axes 1522 exceeds the predetermined threshold (e.x. 50 rpm/min), the LSD 10 increases the volume of fluid delivery, and such transient fluid delivery sets above the volume of fluid release to render at least one differential gear assembly 14 unable to instantaneously drain the fluid through the first and second gears 141,142. Thus, the differential gear assembly 14 promptly produces a back pressure as arrowed in FIG. 7B to create a limited torque T against the clockwise or counter-clockwise rotations ω, which blocks the entry of the fluid into the interstices between the differential gears 141,142. Via the limited torque T, the rotations of the first and second planetary gears 151 associated with the axes 1522 and axle shafts 21 are restricted as well, and the power source 20 would not transmit the dynamic torque to the slipped wheel in higher speed through the driving gear 16. Instead, the power source 20 delivers more torque to the non-slipped wheel in lower speed for equilibrating the rotating velocity and restricting the expansion of the rotational speed difference (shown in FIG. 7A), thereby supplying the non-slipped wheel with enough torque to smoothly propel the vehicle. The LSD 10 thus prevents the slippery idling of the vehicle and efficiently attains a limited-slip effect.

Consequently, by means of the differential gear assemblies 14, the planetary gears 151, and the sun gears 152 are constructed by standard parts, the LSD 10 also does not need a further molding for manufacturing and complex configuration as it could be facilely assembled via the aforementioned commercial parts for convenient repairing and maintenance. The present LSD 10 also utilizes the property of the fluid failing to travel through the interstices of at least one differential gear assembly 14 to concurrently adjust the rotational speed on wheels and decrease the slipped occurrence.

Figure 8:
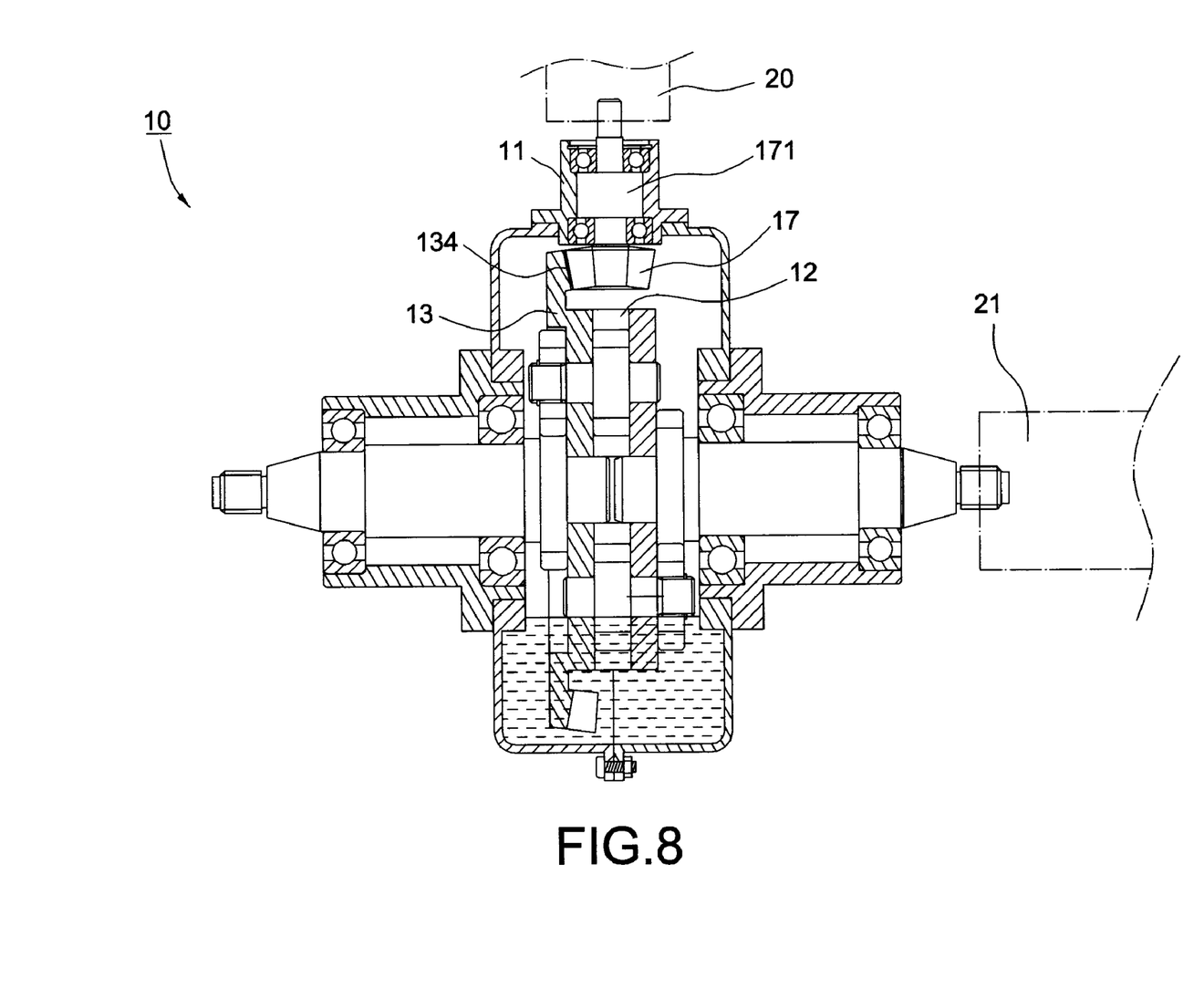
FIG. 8 is a schematic view showing a second preferred embodiment.

Referring to FIG. 8 shows a second preferred embodiment comprising elements similar to those of the first embodiment. Particularly, the driving plate 12 removes the gear teeth 124 and the driving gear 16, whereas one of the backing plates 13 has a bevel gear plate 134 integrally extending from one side thereof, and the differential casing 11 accordingly disposes a bevel gear teeth 17 therein for meshing with and driving the bevel gear plate 134; the bevel gear teeth 17 also includes a shaft 171 projecting out of the differential casing 11 for being driven by the vehicle, so that the shaft 171 driven by the power source 20 of the vehicle would synchronically rotate the bevel gear plate 134, the driving plate 12, and the backing plates 13. Further, the operations and effects of this embodiment are the same as the first embodiment and herein are omitted.

Figure 9:
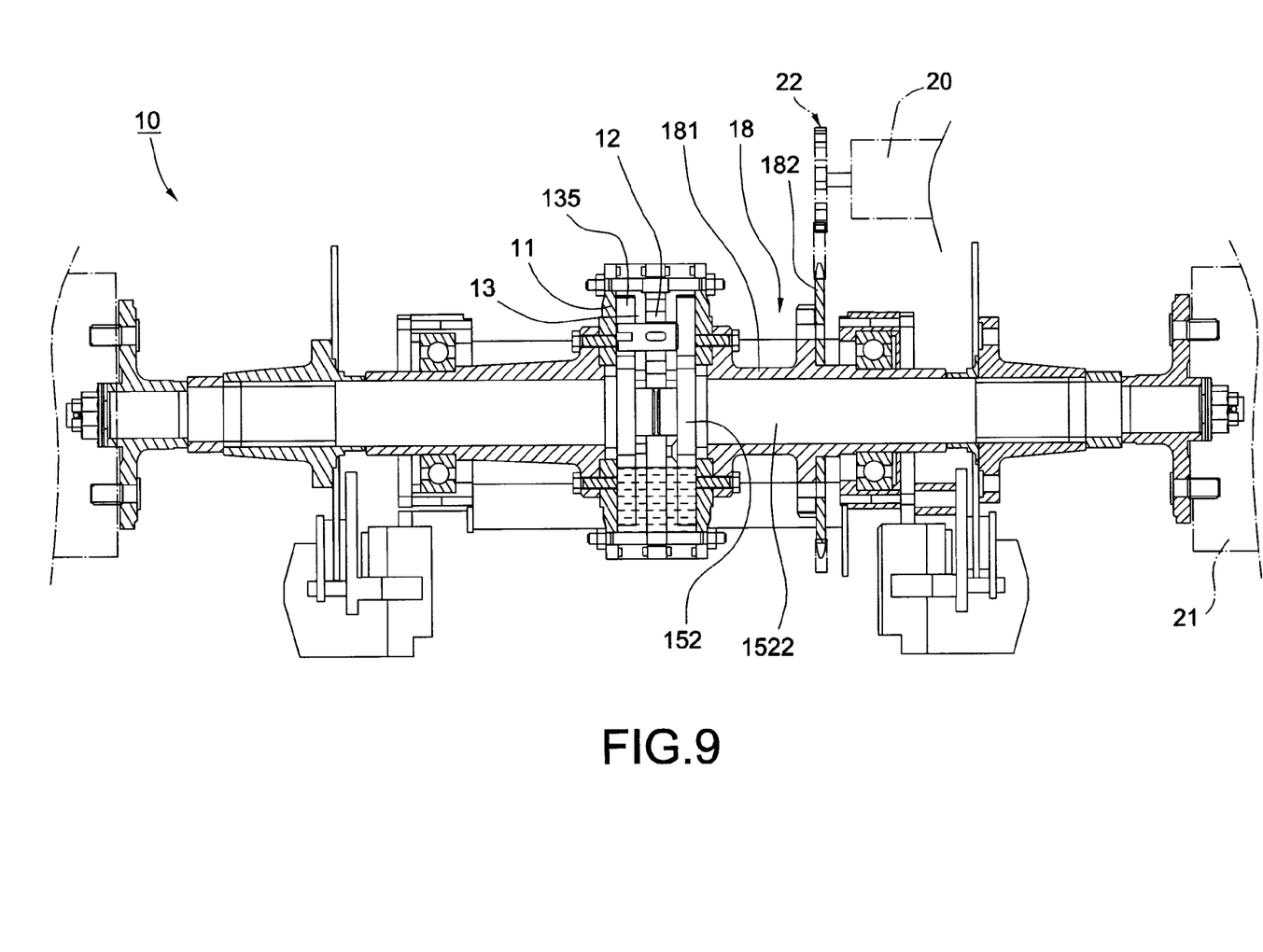
FIG. 9 is a schematic view showing a third preferred embodiment.

Referring to FIG. 9 shows a third preferred embodiment, in which the driving plate 12 and the two backing plates 13 are particularly devoid of the respective structures of the gear teeth 124, the driving gear 16, and the blockers 1331. Instead, the differential casing 11 are firmly fastened to the backing plates 13 and a driving sheath 18 is pivoted to the differential casing 11; wherein, the driving sheath 18 comprises an outer covering 181 extensively encompassing the axes 1522 of the two sun gears 152 and a chain 182 on the outer covering 181 driven by a driving device 22 of the vehicle; additionally, each backing plate 13 includes a depression 135 defined on the outer surface thereof for defining a room between the backing plate 13 and the differential casing 11, on which a plurality of holes 132 and apertures 133 are spaced apart in FIG. 10.

Figure 10:
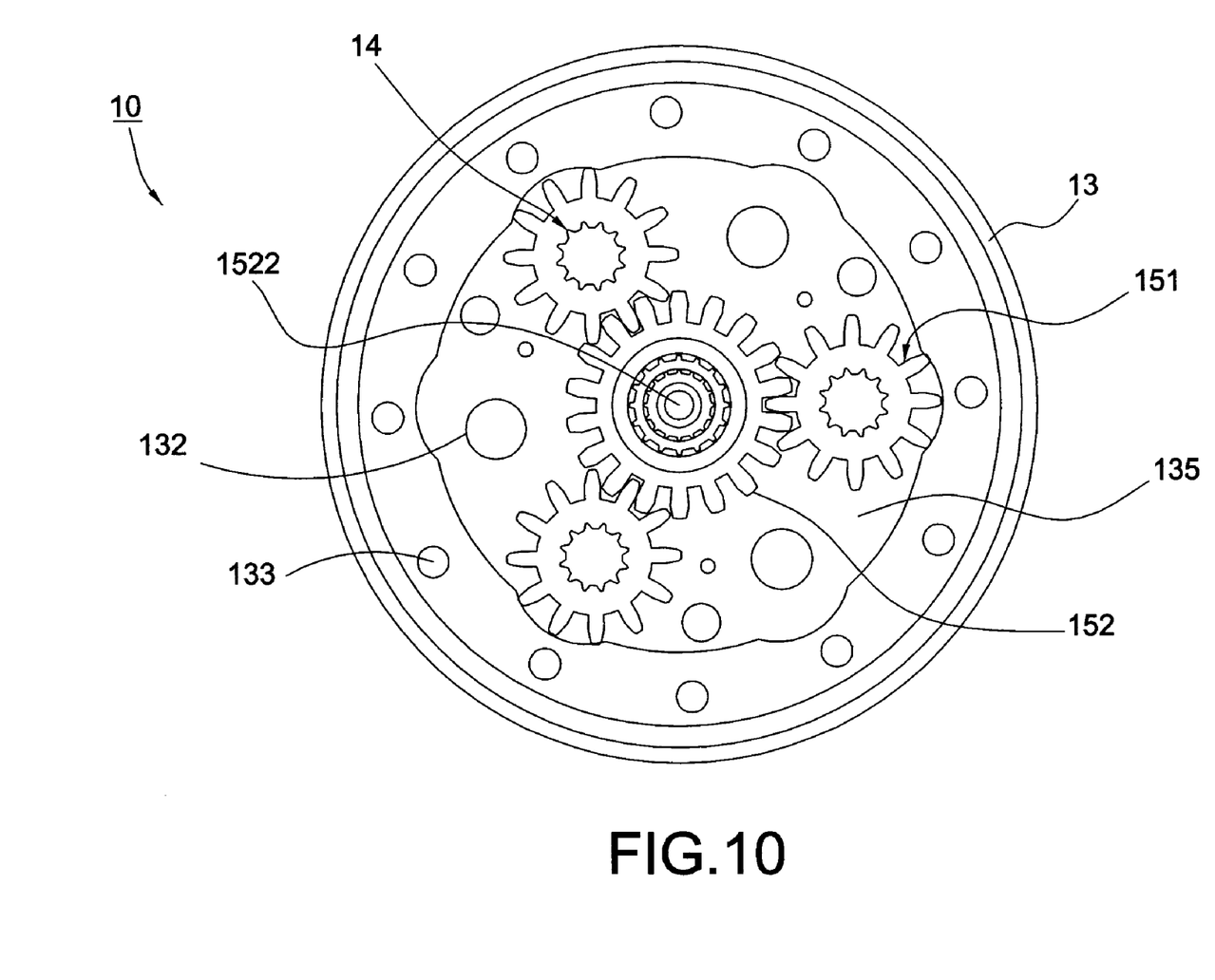
FIG. 10 is a side view showing of FIG. 9.

Referring to FIGS. 9 and 10, in operation, a power source 20 of the vehicle transmits a dynamic torque to the chain 182 through the driving device 22 (e.x. a sprocket associated with a catena), so that the outer covering 181, the differential cashing 11, the backing plates 13, and the driving plate 12 synchronically rotate. When the vehicle is driven forward or backward, the axle shafts 21 on vehicle wheels have the same rotational speed for motivating the synchronous rotations of axes 1522, the planetary gears 151, the driving plate 12, and the backing plates 13 for alternatively soaking the differential gear assemblies 14 into the fluid. Once the vehicle is turned to incur a rotational speed difference greater than a threshold, the fluid received within the room moves away from the center of the depression 135 under a centrifugal force and intensively enters the apertures 133 for significantly coating every differential gear assembly 14 with the fluid. Further, at least one gear assembly 14 acts to block the traveling of the fluid among the differential gears 141,142 and then limits the mutual motions of the two gears 141,142 to permit the vehicle to equally transmit the torque to both axes 1522 of the sun gears 152. Therefore, this preferred embodiment also avoids enlarging the rotational speed difference via efficiently restricting the rotational speed and obtains a preferable limited-slip performance.

Figure 11:
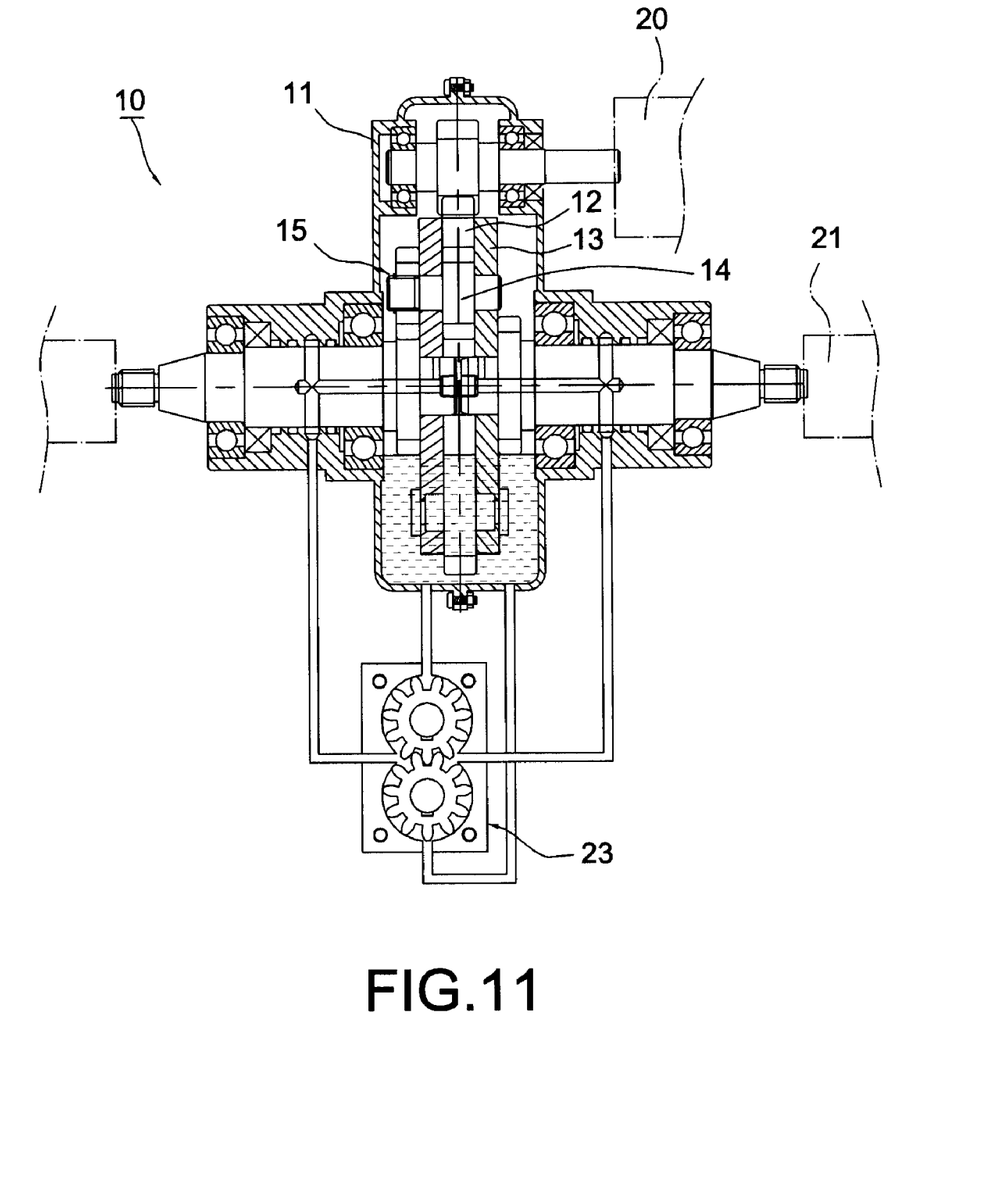
FIG. 11 is a schematic view showing a fourth preferred embodiment.

Referring to FIG. 11, a fourth preferred embodiment comprises same elements in the first embodiment which is classified as a passive LSD (P-LSD) via motivating the different gear assemblies 14 to restrain the successive expansion of rotation speed on the transmission assembly 15 when the rotational speed difference exceeds than the threshold. Whereas, the fourth embodiment classified as an active LSD (A-LSD) especially appends an auxiliary power 23 (e.x. gear pump) to actively adjust the fluid flowing direction and the volume of fluid delivery sent to the differential gear assemblies 14 while turning the vehicle, thereby efficiently controlling the rotation speed of the vehicle wheels for the purposes of speed adjustment and limited-slip effect.

To sum up, the present invention takes advantage of placing a driving plate, backing plates, a transmission assembly, and differential gear assemblies into a sealed casing where fluid is stored, thereby sequentially immersing the differential gear assemblies into the fluid when the afore elements are synchronically rotated. Accordingly, the present invention mainly controls the entry of fluid flow via the mutual motion of the differential gears of each gear assembly for adjusting the rotational speed of the transmission assembly. When the axle shafts on vehicle wheels carry a current rotational speed difference greater than a threshold, at least one transmission assembly would produce a back pressure to block the fluid passing through the relative meshed gears, whereby the gears limit their mutual motion and render the vehicle to transmit a torque toward the non-slipped wheel to avoid enlarging the rotational speed difference and concurrently control the rotational speed as well as promote the limited-slip effect.

While we have shown and described the embodiment in accordance with the present invention, it should be clear to those skilled in the art that further embodiments may be made without departing from the scope of the present invention.

We claim:
1. A limited slip differential applied to a vehicle and driven thereby comprising:
   a differential casing interlocked to form a shared accommodating space for containing fluid;
   a driving plate disposed within said accommodating space for partially soaking in said fluid; said driving plate provided with a plurality pairs of openings substantially disposed therearound; wherein, each pair of said openings including a first opening and a second opening, and said first opening being communicated with said second opening;
   two backing plates respectively having inner sides thereof attached to both sides of said driving plate, wherein, each of said backing plates including a plurality of holes spaced apart thereon, and said holes being disposed correspondingly to said first and said second openings;

a plurality of differential gear assemblies mounted on said driving plate; each of said differential gear assemblies having a first differential gear embedded into said first opening and a second differential gear located within said second opening, so that said first differential gear and second differential gear relatively meshing with each other for permitting said fluid to enter interstices between respective edges thereof through said openings and said holes; and a transmission assembly engaged with said differential gear assemblies to synchronize therewith, and said transmission assembly providing with two sets of planetary gears respectively disposed on both exterior sides of said two backing plates and two sun gears separately meshing with said planetary gears; wherein, said two planetary gears respectively including a first planetary gear and a second planetary gear, and said first and said second differential gears penetrating through said correspondent openings and holes for separately engaging with said first and said second planetary gears; each of said sun gears having an axis provided with one side thereof fastening to said driving plate and with the other side thereof protruding out of said differential casing for mounting on two axle shafts of said vehicle, whereby said vehicle transmitting a dynamic torque to said limited slip differential for soaking said differential gear assemblies and said planetary gears within said fluid in sequence; at least one differential gear assembly creating a back pressure attributable to a rotational speed difference generated from said two axes of said sun gears in time of turning said vehicle being greater than a predetermined threshold, thereby avoiding passing said fluid between said differential gear assembly and resisting said first differential gear rotatively with respect to said second differential gear.

2. The limited slip differential as claimed in claim 1, wherein, said driving plate provides with an inserting bore disposed in a center thereof for said openings to disposed therearound, and each of said backing plates includes an inserting orifice disposed among said holes relatively to said inserting bore, so that said axis of each sun gear provides one side thereof fastening to said inserting bore of said driving plate through said inserting orifice of said backing plate.

3. The limited slip differential as claimed in claim 1, wherein, said first differential gear has a first extension protruding from one side thereof, and said second differential gear also provides with a second extension protruding oppositely to where said first extension extends; said first and said second extensions separately pass through said holes of said two backing plates for significantly meshing with said first and said second planetary gears.

4. The limited slip differential as claimed in claim 1, wherein, said first and said second planetary gears are respectively integrated with said first and said second differential gears.

5. The limited slip differential as claimed in claim 1, wherein, said sun gears have interior teeth meshing with an outer periphery of said planetary gears.

6. The limited slip differential as claimed in claim 1, wherein, one of said backing plates has a bevel gear plate integrally extends from one side thereof, and said differential casing also disposes a bevel gear teeth therein for meshing with and driving said bevel gear plate; said bevel gear teeth includes a shaft driven by said vehicle.

7. The limited slip differential as claimed in claim 1, said differential casing are firmly fastened to said backing plates and a driving sheath is pivoted to said differential casing, wherein, said driving sheath comprises an outer covering extensively encompassing said axes of said sun gears and a chain on said outer covering driven by said vehicle.

8. The limited slip differential as claimed in claim 1, wherein, each backing plate includes a depression formed on an outer surface thereof.

9. The limited slip differential as claimed in claim 1, wherein, an auxiliary power is disposed to actively transport said fluid toward said differential gear assemblies.

10. The limited slip differential as claimed in claim 1, wherein, a driving gear is disposed within said differential casing and includes a driving shaft driven by said vehicle; said driving plate is provided with a gear teeth disposed on a periphery thereof for interlocking with said driving gear.

11. The limited slip differential as claimed in claim 10, wherein, said driving plate sticks said gear teeth out of a circumference of said backing plates.

12. The limited slip differential as claimed in claim 1, wherein, a trough disposed penetrably through said driving plate is defined at both sides of each pair of said openings; said trough communicates with any two adjacent pairs of said openings; a plurality of apertures are defined on each of said backing plates and located correspondently to said troughs for flowing said fluid.

13. The limited slip differential as claimed in claim 12, wherein, a blocker is disposed outside each of said apertures and directed toward a center of said backing plate.

\* \* \* \* \*